(12) United States Patent
Childress et al.

(10) Patent No.: US 8,041,797 B2
(45) Date of Patent: Oct. 18, 2011

(54) APPARATUS AND METHOD FOR ALLOCATING RESOURCES BASED ON SERVICE LEVEL AGREEMENT PREDICTIONS AND ASSOCIATED COSTS

(75) Inventors: Rhonda L. Childress, Austin, TX (US);
David Bruce Kumhyr, Austin, TX (US);
Edgar Allen Marin, Cary, NC (US);
Neil Raymond Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 2525 days.

(21) Appl. No.: 10/815,236

(22) Filed: Mar. 31, 2004

(65) Prior Publication Data

US 2005/0256946 A1 Nov. 17, 2005

(51) Int. Cl.
*G06F 15/173* (2006.01)
*G06F 17/00* (2006.01)
*H04L 12/28* (2006.01)

(52) U.S. Cl. ........ 709/223; 709/225; 709/226; 370/254; 705/402

(58) Field of Classification Search .................. 709/223, 709/225, 226
See application file for complete search history.

(56) References Cited

U.S. PATENT DOCUMENTS

| | | | |
|---|---|---|---|
| 5,867,494 A * | 2/1999 | Krishnaswamy et al. | 370/352 |
| 5,999,525 A * | 12/1999 | Krishnaswamy et al. | 370/352 |
| 6,519,627 B1 * | 2/2003 | Dan et al. | 709/203 |
| 6,556,659 B1 * | 4/2003 | Bowman-Amuah | 379/9.04 |
| 6,654,374 B1 * | 11/2003 | Fawaz et al. | 370/394 |
| 6,782,421 B1 * | 8/2004 | Soles et al. | 709/223 |
| 6,925,493 B1 * | 8/2005 | Barkan et al. | 709/223 |
| 7,082,463 B1 * | 7/2006 | Bradley et al. | 709/223 |
| 2002/0075844 A1 * | 6/2002 | Hagen | 370/351 |
| 2003/0046396 A1 * | 3/2003 | Richter et al. | 709/226 |
| 2003/0120764 A1 * | 6/2003 | Laye et al. | 709/223 |
| 2003/0120771 A1 * | 6/2003 | Laye et al. | 709/224 |
| 2003/0208523 A1 * | 11/2003 | Gopalan et al. | 709/201 |
| 2003/0212778 A1 * | 11/2003 | Collomb | 709/223 |
| 2003/0229714 A1 * | 12/2003 | Kiremidjian et al. | 709/244 |
| 2003/0229720 A1 * | 12/2003 | Kiremidjian et al. | 709/253 |

(Continued)

OTHER PUBLICATIONS

Service Level Management Buyer's Guide, 2002 Enterprise Management Associates, Inc., pp. 1-5.

(Continued)

*Primary Examiner* — William Vaughn, Jr.
*Assistant Examiner* — Umar Cheema
(74) *Attorney, Agent, or Firm* — Yee & Associates, P.C.; Jeffrey S. LaBaw

(57) ABSTRACT

A method, apparatus, and computer instructions for allocating resources based on predictions of service level agreement (SLA) breaches in order to minimize costs are provided. With the method, apparatus, and computer instructions, a prediction that an SLA will be breached is received from a prediction engine associated with the SLM system. Based on a prediction that an SLA will be breached, a minimum cost analysis is performed to determine if computer resources may be shifted from another service consumer under another SLA to facilitate the service consumer of the potentially breached SLA in order to reduce the cost of the penalty associated with breaching SLAs. If so, resources are reallocated in order to minimize penalties associated with SLA breaches.

20 Claims, 5 Drawing Sheets

U.S. PATENT DOCUMENTS

| | | | |
|---|---|---|---|
| 2004/0064351 A1* | 4/2004 | Mikurak | 705/7 |
| 2004/0215430 A1* | 10/2004 | Huddleston et al. | 703/2 |
| 2005/0055446 A1* | 3/2005 | Chidambaran et al. | 709/226 |
| 2005/0149610 A1* | 7/2005 | Brooks et al. | 709/200 |
| 2006/0168203 A1* | 7/2006 | Levillain et al. | 709/224 |
| 2006/0178918 A1* | 8/2006 | Mikurak | 705/7 |
| 2006/0242313 A1* | 10/2006 | Le et al. | 709/230 |
| 2006/0293942 A1* | 12/2006 | Chaddha et al. | 705/8 |
| 2007/0038750 A1* | 2/2007 | Jorgensen | 709/226 |

OTHER PUBLICATIONS

IBM Tivoli Service Level Advisor—Predicting Service Level Assurance, 2002 Enterprise Management Associates, Inc., 1 page.

IBM Tivoli Management Suite—Guaranteed Service Delivery, 2002 Enterprise Management Associates, Inc., Apr. 2002, pp. 1-10.

IBM Tivoli Service Level Advisor, http://www-306.ibm.com/software/tivoli/products/service-level-advisor, Feb. 23, 2004, pp. 1-2.

* cited by examiner

APPARATUS AND METHOD FOR ALLOCATING RESOURCES BASED ON SERVICE LEVEL AGREEMENT PREDICTIONS AND ASSOCIATED COSTS

RELATED APPLICATIONS

The present application is related to co-pending and commonly assigned U.S. patent application Ser. No. 10/672,777 entitled "Real-Time SLA Impact Analysis", filed on Sep. 26, 2003 and U.S. patent application Ser. No. 10/612,190 entitled "Methods, Systems and Computer Program Products for Early Warning of Potential Service Level Agreement Violations", filed on Jul. 2, 2003, which are hereby incorporated by reference.

BACKGROUND OF THE INVENTION

1. Technical Field

The present invention is generally directed to allocation of computer system resources based on service level agreements (SLAs). More specifically, the present invention is directed to an apparatus and method for allocating computer system resources based on predictions of whether a SLA will be breached and the associated costs.

2. Description of Related Art

In the information technology (IT) based business place of today in which information services are provided by computer resource suppliers and are consumed by information services consumers, requirements for service level guarantees have created a demand for accountability that transcends enterprise and service provider environments. Inside enterprise organizations, service commitments are needed to justify astronomical expenditures for IT infrastructure. Service providers must prove the value of services being delivered, particularly in light of the fact that these services are often obtained at a premium price—failure to deliver may mean the success or failure of the service provider. For both, service level agreements (SLAs) define the terms for measuring service accountability. Service Level Management (SLM) enables the definition, measurement and reporting of SLA compliance.

SLAs can apply to almost any service imaginable. Historical examples for IT include the outsourcing of wide area network (WAN) managed services or remote local area network (LAN) services. Other cases may involve the combination of technologies for a given business service such as network and servers that support an overriding quality of service (QoS) for an enterprise financial application. Trends show that application and transaction-oriented SLAs are on the rise.

Increasingly, IT managers and service providers are seeking flexible, standards-based SLM tools to measure adherence to SLAs. The challenges of delivering IT services center around ensuring end-to-end availability and performance across diverse technological infrastructure with the goal of maintaining and improving end-user satisfaction. One solution that addresses these issues with measuring the adherence to SLAs is IBM Tivoli's Service Level Advisor™ (hereafter, Service Level Advisor).

The Service Level Advisor provides a number of SLM functions that aid in simplifying the building, managing and reporting of SLAs. Service Level Advisor provides for automatic discovery of service-level resources, automatic evaluation of service-level agreements, and provides trend analysis capabilities. Service Level Advisor uses system management information stored in a data warehouse on service-level metrics and available components. This information is automatically available for selection as part of an SLA. In addition, Service Level Advisor automatically compares the terms of the SLAs (such as metrics, thresholds, business schedules, etc.) with monitored data from IT environments and generates alerts when any of the terms of the SLA are violated.

Of particular note, the Service Level Advisor uses a trend-analysis algorithm to proactively maintain service levels. The Service Level Advisor uses a linear-based algorithm and an exponential stress detection algorithm that provide predictive abilities to provide advance warning of breaches of an SLA and facilitate the fixing, optimizing and protecting of IT service elements.

FIG. 1 is an exemplary diagram of the architecture for the Service Level Advisor. The Service Level Advisor is a SLM solution composed of multiple components that are fully integrated in a seamless fashion. At the core of the solution is the data warehouse 110, where all the data from external sources is stored. The data warehouse 110 collects data from multiple sources, such as IBM Tivoli's Security and Storage Tools™, Business Systems Manager™, IBM Tivoli Monitoring for Transaction Performance™ (formerly Tivoli Web Services Manager™ and Tivoli Application Performance Manager™), IBM Tivoli Enterprise Console™, databases, log files, and mainframe applications as well as custom and third-party applications data. Once the data from these various sources is collected in the data warehouse 110, the data is aggregated and correlated by the data warehouse manager 115.

Data specific to defined service level offerings (SLOs) within the Service Level Advisor are rolled from the data warehouse 110 into the SLM Datamart 120. The data rollups consist of delta data so that the impact to the infrastructure from the data transfer is kept to a minimum. The SLM Datamart 120 contains measurement data of how monitored components are doing in comparison to SLOs. The SLM Datamart 120 also contains summary data as a result of service level evaluations. It is the data in the SLM Datamart 120 that is used for Service Level Advisor reporting and trend analysis.

The SLM database 130 stores the definitions of the data sources. For example, IMB Tivoli Distributed Monitoring™ is a data source and within this application, the user has visibility into disk, cpu, memory, network, as well as process monitors. This information becomes visible to the user through the SLM database 130 and is also available as service threshold triggers in the Service Level Advisor. New data source definitions are rolled up to the SLM database 130 from the data warehouse on a user specified interval. It is these components within the SLM database 130 that are used in the building of an order, i.e. a SLA.

The server components that make up the Service Level Advisor solution are the administrative server 140, the SLM server 150, and the reports server 160. These components can reside on a single system or can be distributed. The administrative server 140 facilitates the definition and maintenance of offerings and orders (i.e. SLOs and SLAs), while the SLM server 150 provides the core services monitoring functionality. That is, the SLM server 150 determines when service breaches occur or predicts when they will occur through its trend analysis capabilities and notifies the user.

The reports server 160 within the Service Level Advisor, enables viewing of the data within the SLM Datamart 110. These reports can be pulled up and viewed in an ad-hoc fashion or they can be scheduled. Examples or reports that may be viewed using the reports server 160 include aggregate and summary views of data targeted at the Executive, Customer, and Operations level, reports showing trends towards violations, actual SLA violations, results achieved, as well as SLA components.

Typically, computer resources are allocated to service consumers as the resources are required within the confines of the SLAs and if such resources are available. That is, the SLM systems, such as Service Level Advisor, monitor the demand for computer resources, the current allocation of computer resources, the various metrics representative of the level of service being provided, and the SLA with the service consumer. If the demand is high enough such that the current allocation of computer resources does not provide a level of service in the SLA requirements, as determined from the monitored metrics, and there are available resources that may be allocated, these computer resources are then allocated to the service consumer such that the minimum level of service agreed upon in the SLA is met.

However, the pool of available computer resources is finite and may not be sufficient to meet all the demands of the various service consumers being serviced. For example, if a cluster of servers is the host of a plurality of popular web sites, the demand for bandwidth, processor usage, and the like, in order to achieve the minimum levels of service under each of the SLAs for the various web sites may not be possible with the finite resources available. This will lead to breaches of SLAs with the service provider having to pay a penalty to the service consumer for not having met the minimum requirements of the SLA, or worse—loss of business from the service consumer.

The penalties for breaching a SLA may be significant depending upon the particular service consumer and the agreement reached with them. It would be beneficial to be able to minimize the amount of loss due to breaching of SLAs because of limited available resources. Therefore, it would be advantageous to have an improved method, apparatus, and computer instructions for weighing the penalties of breaching SLAs to determine a lowest cost alternative for resource allocation.

SUMMARY OF THE INVENTION

The present invention provides a method, apparatus, and computer instructions for allocating resources based on predictions of service level agreement (SLA) breaches in order to minimize costs. With the method, apparatus, and computer instructions of the present invention, a prediction that an SLA will be breached is received from a prediction engine associated with the SLM system. This prediction may be based upon metrics measured by the service level management (SLM) system, historical information, as well as various prediction algorithms, and the like, as compared to SLA requirements.

Based on a prediction that an SLA will be breached, the present invention performs a minimum cost analysis to determine if computer resources may be shifted from another service consumer under another SLA to facilitate the service consumer of the potentially breached SLA in order to reduce the cost of the penalty associated with breaching SLAs. Such analysis involves determining the costs associated with breaching each SLA currently being serviced by the computer system, the amount of resources that may be diverted from each service consumer to the service consumer whose SLA is predicted to be potentially breached, and the best allocation of resources to service consumers in order to minimize costs due to breaching SLAs. The analysis, in more complex embodiments, may further involve taking into account history information identifying how often breaches of a particular service consumer's SLAs have occurred within a predetermined period of time, "tie breaker" algorithms, e.g., selecting the SLA associated with the most failures, and the like, in order to determine a best candidate service consumer(s) for redirection of their allocated resources to the service consumer associated with the SLA that is predicted to be potentially breached.

For example, assume that if a first SLA is breached, the penalty that may be required under the SLA is $1,000,000.00 per day in damages and under a second SLA, breach will result in $200,000.00 in damages having to be paid by the service provider. The penalty associated with breaching a SLA may be minimized to $200,000.00 by breaching the second SLA instead of the first SLA, resulting in a loss savings of $800,000.00.

The present invention provides automated mechanisms for performing such analysis and provides automated mechanisms for overriding default resource allocation in order to divert resources from a service consumer associated with a SLA selected for breach, and reassigns those resources to the SLA that was predicted as being potentially breached.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 3:
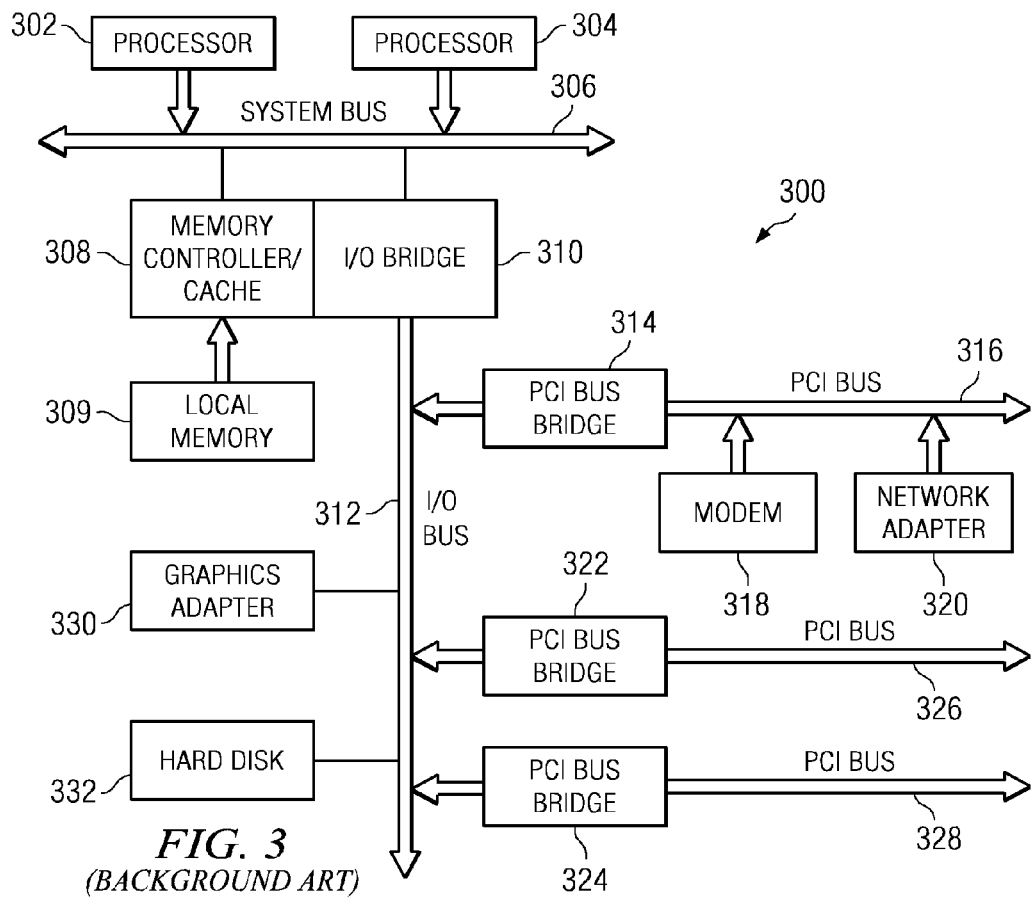
FIG. 3 is a block diagram of a data processing system that may be implemented as a server in accordance with a preferred embodiment of the present invention.
Figure 4:
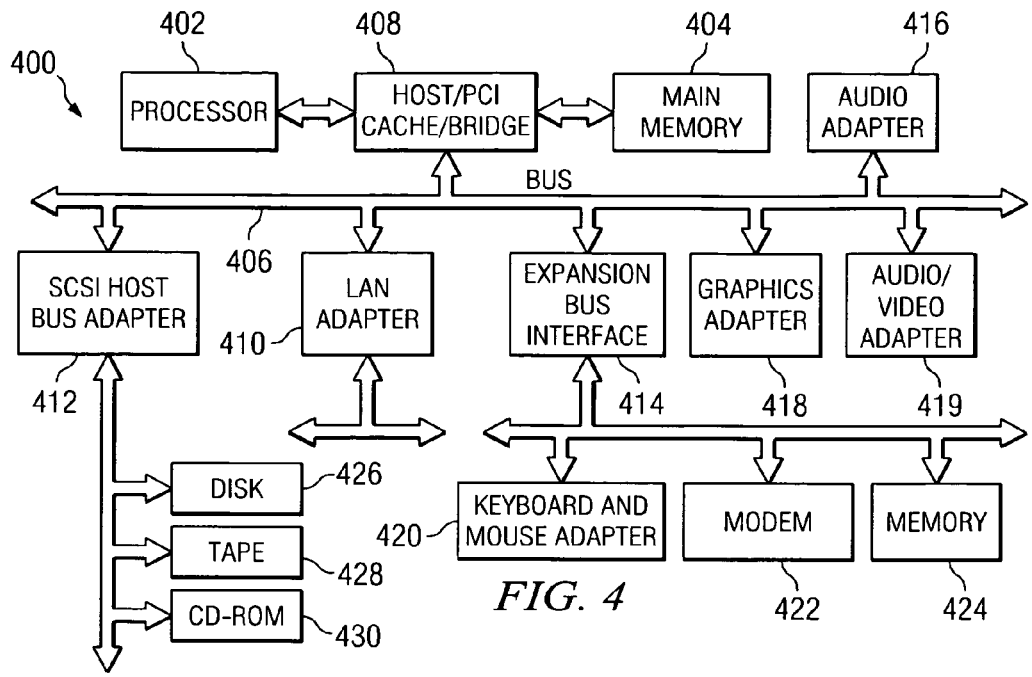
FIG. 4 is a block diagram illustrating a data processing system in which the present invention may be implemented.

The present invention provides a mechanism for minimizing losses due to SLA breaches by automatically determining which SLAs to breach and which SLAs not to breach when a SLA breach is predicted to be imminent. As such, the present invention is preferably implemented in one or more computing devices associated with a distributed data processing system, such as the Internet. Therefore, the following description of FIGS. 2-4 is provided as a background of one exemplary distributed data processing system in which the present invention may be implemented.

Figure 1:
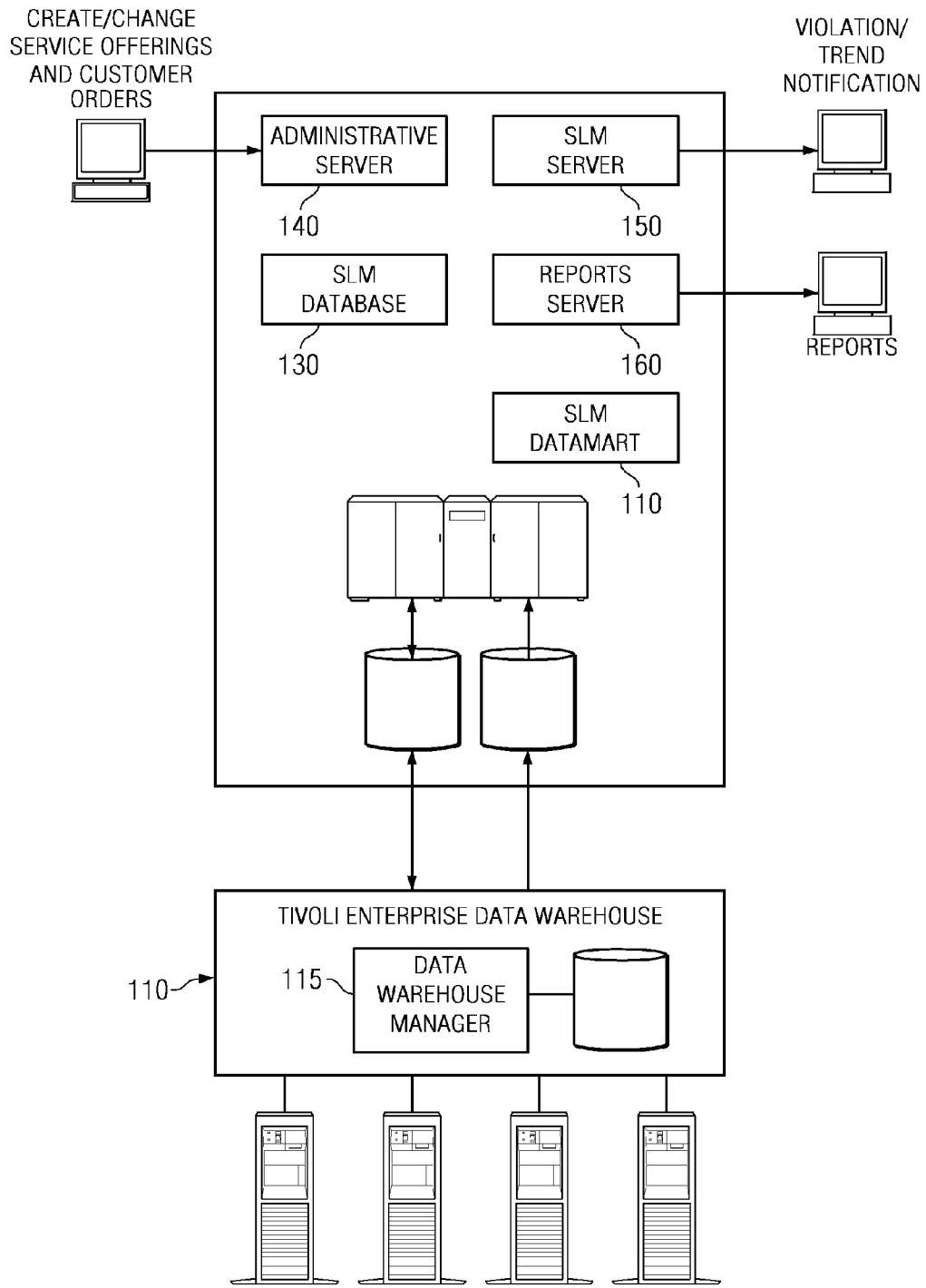
FIG. 1 is an exemplary diagram of an architecture for IBM Tivoli's Service Level Advisor.
Figure 2:
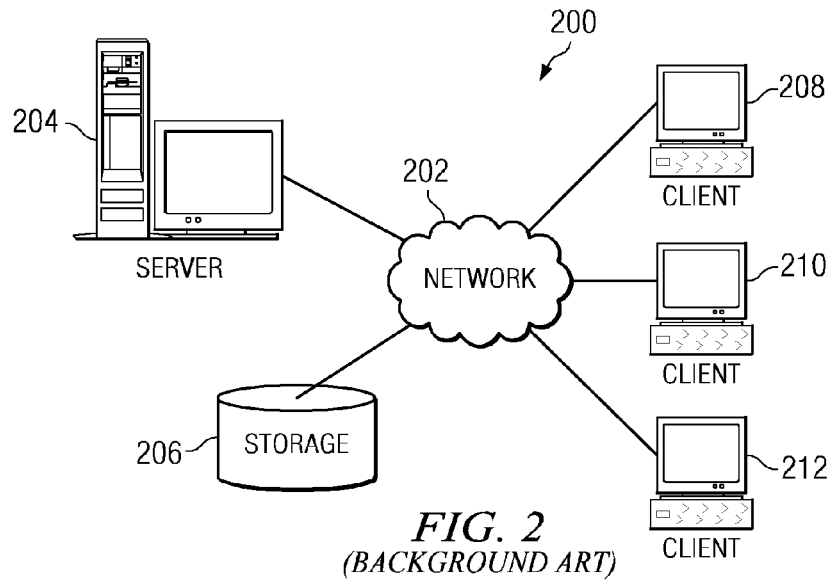
FIG. 2 depicts a representation of a network of data processing systems in which the present invention may be implemented.

With reference now to the figures, FIG. 2 depicts a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, server 204 is connected to network 202 along with storage unit 206. In addition, clients 208, 210, and 212 are connected to network 202. These clients 208, 210, and 212 may be, for example, personal computers or network computers or personal digital assistants (PDA) devices. In the depicted example, server 204 provides data, such as boot files, operating system images, and applications to clients 208-212. Clients 208, 210, and 212 are clients to server 204. Server 204 may act as an instant messaging server to facilitate the exchange of messages between users at clients, such as clients 208, 210, and 212. Network data processing system 200 may include additional servers, clients, and other devices not shown.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208-212 in FIG. 2 may be provided through modem 318 and network adapter 320 connected to PCI local bus 316 through add-in boards.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

With reference now to FIG. 4, a block diagram illustrating a data processing system is depicted in which the present invention may be implemented. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

In accordance with the present invention, a server or plurality of server systems, such as server 204, provides information technology services to service consumers. The information technology services discussed herein may take many different forms. For example, the information technology services may be various services that support the establishment and maintenance of electronic business systems. Examples of these information technology services may include services that facilitate the creation and maintaining of web sites, order processing, inventory management, payment processing, database management, data storage and maintenance, and the like.

The service consumers, from the stand point of the services provider, may be, for example, business entities that wish to establish electronic businesses or otherwise make use of information technology services offered by the services provider. Thus, the service consumers enter into agreements with the services provider(s) to establish electronic businesses using the information technology services offered by the services provider. In such a relationship, the service consumers provide the business aspects of the electronic business while the services provider provides the information technology services infrastructure to host the electronic business.

Customers of the electronic business access the electronic business via the network 202 using their client devices 208, 210 and 212, for example. In this way, the customers may obtain the goods and services offered by the business entity via the electronic business that is established using the information technology services of the information technology services provider.

In accordance with the present invention, the information technology (IT) services provider includes a Service Level Management (SLM) system with the (IT) services infrastructure that actually provides the resources for hosting the electronic businesses for the services consumers. The SLM system may take many forms. Preferably, the SLM system includes facilities for monitoring end-to-end metrics for the providing of services to services consumers, comparing those metrics to stored service level agreement (SLA) requirements, and notifying the services provider and/or the services consumers when the SLA requirements have not been met. In addition to these SLM system functions, a prediction engine is preferably provided for predicting whether a SLA requirement breach is imminent.

In a preferred embodiment, the SLM system is IBM Tivoli's Service Level Advisor™ in which a trend analysis is used to generate predictions regarding SLA breaches. Examples of such trend analysis is provided in incorporated U.S. patent application Ser. No. 10/672,777 entitled "Real-Time SLA Impact Analysis", filed on Sep. 26, 2003 and incorporated U.S. patent application Ser. No. 10/612,190 entitled "Methods, Systems and Computer Program Products for Early Warning of Potential Service Level Agreement Violations", filed on Jul. 2, 2003. While Service Level Advisor is a preferred embodiment of the SLM of the present invention, the present invention is not limited to such and any SLM system that facilitates prediction of SLA breaches may be used without departing from the spirit and scope of the present invention.

The present invention provides a method, apparatus, and computer instructions for determining how to allocate information technology services resources in the presence of a predicted imminent SLA requirement breach. These resources may be any computer resource that is utilized by one or more services consumers and is allocated to the services consumer's business applications based on a service level agreement. Examples of such computer resources include, but are not limited to, memory, bandwidth, cpu processing time, hard disk space, and the like.

In one exemplary embodiment, the present invention is an improvement on the Service Level Advisor from IBM Tivoli, in which the predictions generated by the Service Level Advisor are used as a basis for the functionality of the present invention. The present invention is not limited to use with the Service Level Advisor and may be used with any SLM system in which a prediction regarding SLA requirement breaches may be made.

The present invention, in response to a prediction of an imminent SLA requirement breach, determines if there are additional available resources that may be allocated to the services consumer's electronic business applications that are being hosted by the services provider. If there are additional available resources, they are allocated to the services consumer's electronic business applications and a determination is made as to whether the additional resources have adequately alleviated the imminent SLA requirement breach. If not, and/or there are no further available resources to provide to the services consumer's electronic business applications, the present invention performs a cost minimization analysis to determine how to reallocate resources.

In order to perform cost minimization analysis, the present invention gathers information regarding the SLA requirements for each of the services consumers whose electronic businesses are currently being hosted by the services provider. In addition, information about the current allocation or resources to each services consumer's electronic business applications is determined. Based on this information, a ranking of the services consumers may be made based on penalty associated with breaching of the SLA requirements.

In addition, a ranking of the services consumer's electronic business applications may be made based on the current allocation of resources. The services consumer's electronic business applications that have a minimum amount of resources that would be necessary to avoid the SLA breach and which has a lowest penalty associated with it, assuming that the lowest penalty is less than the penalty associated with permitting the predicted SLA requirement breach, may then be selected as a candidate for reallocation of its resources. Alternatively, simply the services consumer's electronic business applications that have a minimum penalty associated with them, and which has a lower penalty than that associated with permitting the predicted SLA requirement breach, is chosen as a candidate for reallocation of resources to the services consumer electronic business applications associated with the predicted SLA requirement breach.

Reallocation of resources may be performed in any known manner. For example, the resources may be positively partitioned for use by the services consumer electronic business applications of the predicted SLA requirement breach. Alternatively, relative priorities used for resource allocation between services consumer electronic business applications may be adjusted to favor the electronic business applications of the predicted SLA requirement breach. In addition, rather than reallocating only the resources associated with one services consumer's electronic business applications, this reallocation may be performed with resources from a plurality services consumers' electronic business applications. This may be easily performed by using an adjustment in priorities for resource allocation such that the electronic business applications from which resources are being reallocated are given a lower priority than the electronic business applications associated with the predicted SLA requirements breach.

Thus, with the present invention, the prediction capabilities of the SLM system are utilized to determine when reallocation of resources should be performed. The present invention provides an automatic mechanism for reallocating these resources such that any penalty that may be incurred by the information technology services provider is minimized. This penalty minimization is performed by making a cost minimization analysis to thereby reallocated resources from lower penalty SLAs to higher penalty SLAs.

Figure 5:
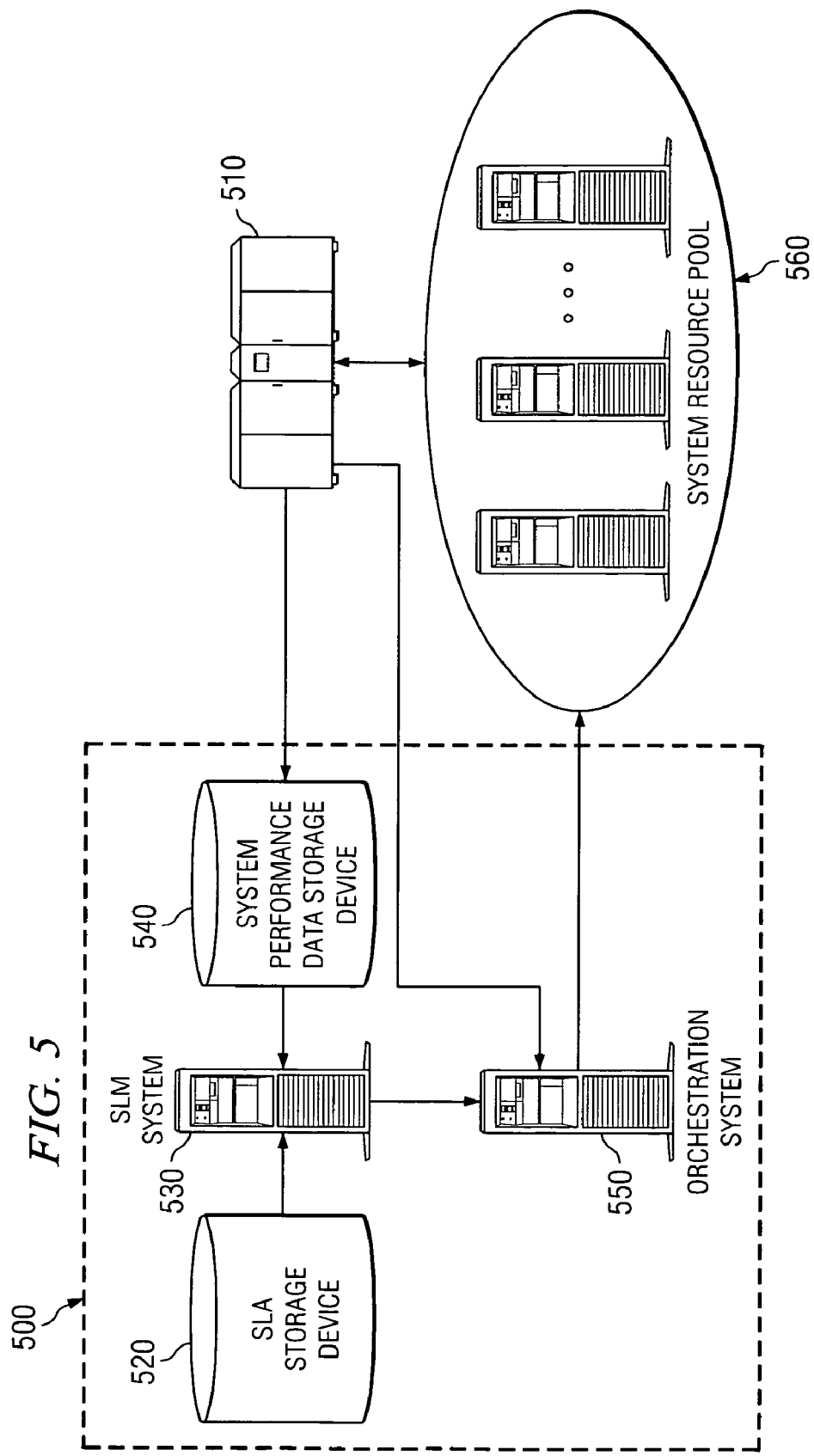
FIG. 5 is a block diagram illustrating the primary operational components of a service level management system according to one exemplary embodiment of the present invention.

FIG. 5 is a block diagram illustrating the primary operational components of a service level management system according to one exemplary embodiment of the present invention. As shown in FIG. 5, a services provider system 510 is provided which is the focal point for accessing the service provider's resources and the service consumers' business applications that are being hosted by the service provider. The remaining depicted elements are a "behind-the-scenes" architecture or SLM infrastructure that is used by the present invention to facilitate the hosting of one or more service consumers' business applications.

The SLM infrastructure 500 includes a SLA storage device 520, a SLM system 530, a system performance data storage system 540, an orchestration system 550, and a system resources pool 560. With the present invention, a services consumer enters into a legal contract for the services provided by the services provider. This legal contract is reduced to a machine readable format, such as an extensible markup language (XML) document that is stored in the SLA storage device 520. The machine readable legal contract sets forth the conditions for providing services to the service consumers as well as the payments, penalties, etc. associated with performance and non-performance of the minimum requirements of the contract. This contract will typically include the manner by which compliance will be measured, i.e. the metrics that will be monitored, and the minimum required service levels. For example, the legal contract may set forth the bandwidth requirements, amount of storage space to be allotted, average amount of processing cycles to be allotted, and the like, to the business applications of the service consumer. In addition, consequences of failure to provide these minimum requirements of the legal contract may be provided, e.g., for a first failure to to provide the services contracted for, a penalty of $100,000.00 per day may be payable, for a second failure to provide the contracted services, the penalty may be increased to $200,000.00 per day, for further failures, no payment for services will be required for a designated term, etc. This information may be reduced to machine readable parameters that are stored in an XML document and thus, may be extracted from the XML document. The contract, when reduced to a machine readable form, is referred to herein as a service level agreement (SLA). Generating a SLA from a legal contract is generally known in the art.

The SLM system 530 monitors system performance data that is collected from the services provider system 510 and stored in the system performance data storage device 540. This system performance data that is monitored is compared to the SLA data stored in the SLA storage device 520 to determine if the SLA requirements are being met. In addition, as discussed previously, the SLM system 530 may predict, based on measured metrics, whether a SLA will be breached.

The SLM system 530 preferably communicates with the orchestration system 550 whose purpose is to govern the allocation of system resources from the system resource pool 560. The orchestration system 550 receives demands for additional system resources from the services provider system 510 and, using a default system resource allocation mechanism, allocates additional resources or frees resources to/from service consumer business applications. The orchestration system 550 also receives the results of the comparison of the measured metrics to the SLA data from the SLM system 530 and determines whether to override default system resource allocation mechanisms of the orchestration system 550.

It should be noted that, while FIG. 5 depicts the various entities 510-560 as separate entities, the present invention is not limited to such an architecture. On the contrary, any of the entities may be combined into a single system or may be distributed across a plurality of systems without departing from the spirit and scope of the present invention. For example, the SLA storage device 520, the SLM system 530, the system performance data storage system 540, and the orchestration system 550 may all be integrated into a single system that is co-located and/or in the same software package. Other combinations of entities, other than that depicted, may be utilized without departing from the spirit and scope of the present invention.

When the SLM system 530 predicts that a SLA breach is imminent, the SLM system 530 notifies the orchestration system 550. The orchestration system 550 determines if there are available system resources from the system resource pool 560 that can be allocated to the service consumer's business applications to avoid the SLA breach. If so, then those system resources are allocated to the consumer's business applications in order to maintain at least the minimum requirements of the SLA that is predicted to be breached.

If there are no available system resources, or if there are not enough available system resources, left in the system resources pool, i.e. the system resources are currently allocated to other service consumer business applications, then the orchestration system 550 determines the best alternative for breaching an SLA which minimizes the penalty to the service provider. In determining the best alternative for breaching an SLA, the orchestration system 550 gathers SLA data for each of the currently active services consumer business applications being hosted by the services provider system 510. The SLA data includes penalty information identifying how much of a penalty will be paid by the service provider when the service provider fails to provide the minimum level of service agreed upon in the SLA.

In addition, the orchestration system 550 may gather current resource allocation information from the SLM system 540 in order to determine how much of the system resource pool 560 is currently allocated to each services consumers' business applications. This information, in combination with the penalty information obtained from the SLA data storage device 520 may be used to determine which services consumer's business applications have sufficient resources to be reallocated to avoid the predicted breach of the SLA and which of these services consumer's have a SLA penalty that is less than that of the service consumer whose SLA is predicted to be in imminent breach. In some instances it may not be possible to reallocate system resources from only one services consumer's business applications in order to avoid the predicted breach. In such cases, it is necessary to take into consideration a combination of services consumer's business applications and their related SLA penalties.

The combination of SLA penalty and allocated system resources is used in a preferred embodiment because it may not be the most optimal solution to reallocate system resources from the lowest SLA penalty service consumer's business applications if such a reallocation will not be sufficient to avoid the predicted breach. In some cases it may be a more optimal solution to reallocated system resources from a services consumer's business applications which are associated with a higher SLA penalty because that services consumer's business applications may have sufficient resources to be reallocated to avoid the predicted breach.

The present invention is not limited to any particular mechanism for determining the optimum reallocation of system resources to reduce the penalties paid by the services provider. Any algorithm that may be devised for determining how to reallocate resources to minimize costs associated with breaching SLAs may be used without departing from the spirit and scope of the present invention. Such algorithms may be as simple as identifying the lowest penalty associated with currently active SLAs, may involve a determination based on both penalties associated with active SLAs and the current resource allocations to services consumers' business applications, or even more complex determinations taking into account other factors. For example, historical information regarding previous SLA breaches may be used to determine whether to risk additional SLA breaches by reallocating resources from the services consumer's business applications. Moreover, in the event that the penalty costs associated with two or more SLAs are equal, a "tie breaker" algorithm may be used to select one of the SLAs as the preferred SLA to breach, e.g., the SLA associated with the business applications with the most failures may be selected as a default. In these more complex embodiments of the present invention, expert systems, neural networks, inference engines, or the like, may be employed in order to make the determination as to how to reallocate system resources to minimize the penalties paid by the services provider.

Once a minimum cost or minimum penalty solution is obtained, the orchestration system 550 reallocates system resources from the system resources pool 560 in accordance with the determined minimum penalty solution. In this way, the predicted breach of the SLA, which may have a higher penalty associated with it than breaching other currently active SLAs, may be avoided in favor of breaching another SLA that has a lower penalty associated with it. If, however, the predicted SLA breach is the lowest penalty solution, then the predicted SLA breach may be allowed to occur without reallocating the system resources. Thus, the costs associated with SLA breaches are minimized through the use of the present invention.

It should be noted that while the above description is provided in terms of the optimum breach determination being made by the orchestration system 550, the present invention is not limited to such an embodiment. Rather, in an alternative embodiment, the SLM system 540 may actually perform the decision making regarding the optimum SLA to breach in order to minimize penalty costs. In such an embodiment, a feedback loop may be provided between the SLM system 540 and the orchestration system 550 such that resource allocation performed by the orchestration system 550 in response to the determinations made by the SLM system 540 may be checked to determine if a desired result is obtained. In this way, the feedback loop may provide a mechanism by which the SLM system 540 refines its determination as to the optimum SLA to breach to minimize penalty costs to the service provider based on system resource allocations made by the orchestration system 550.

Figure 6:
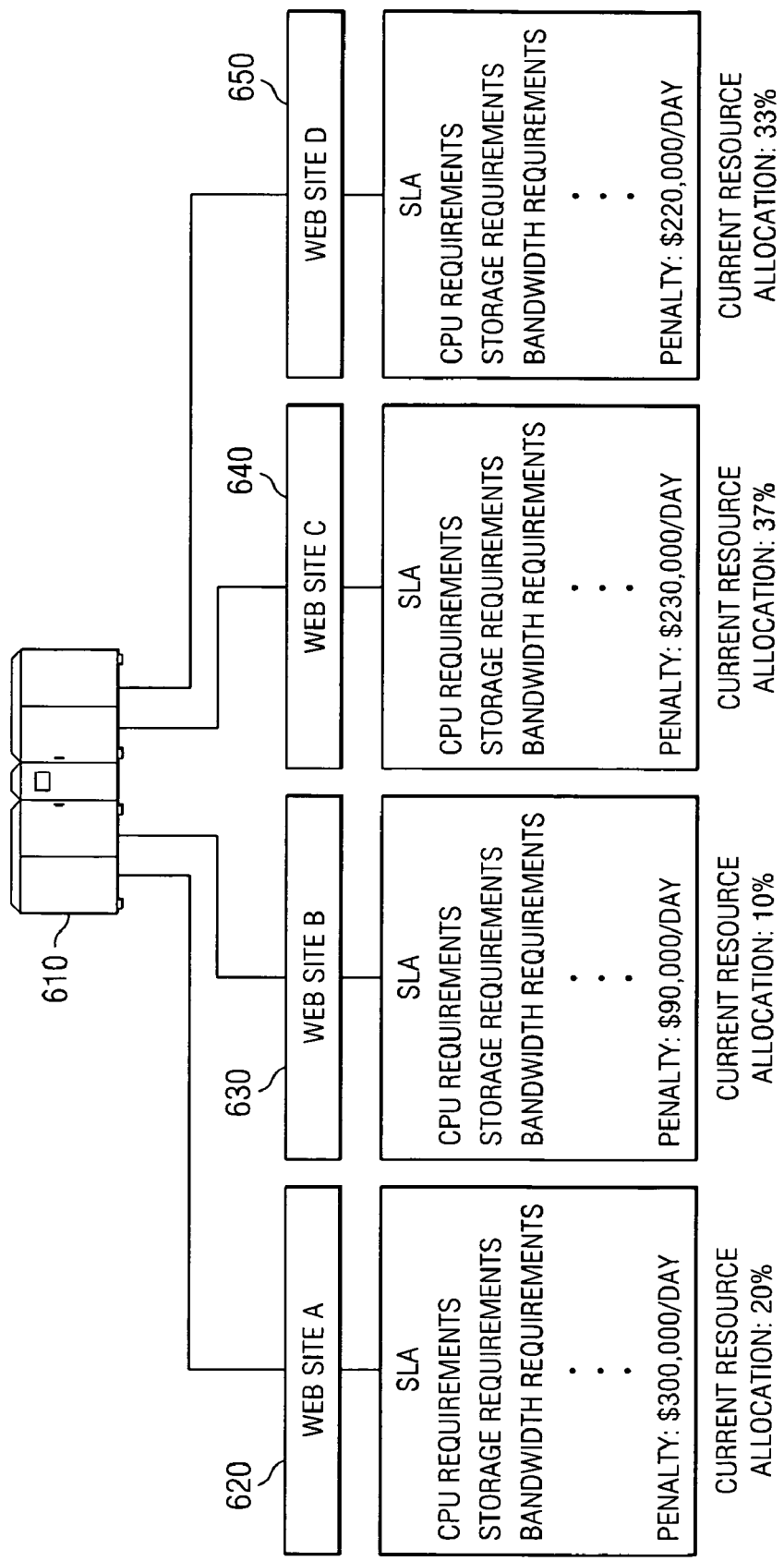
FIG. 6 is a block diagram illustrating an example operation of one embodiment of the present invention with regard to redirecting allocation of resources in order to minimize losses due to service level agreement breaches.

FIG. 6 is a block diagram illustrating an example operation of one embodiment of the present invention with regard to redirecting allocation of resources in order to minimize losses due to service level agreement breaches. As shown in FIG. 6, there are four web sites 620-650 currently being hosted by the services provider system 610. Each web site 620-650 has an associated SLA established with the services provider by the services consumer for that web site. This SLA is reduced to a machine readable format and is stored for use by the SLM system of the present invention when monitoring compliance with the SLA and predicting SLA breaches. The services provider system includes facilities for monitoring metrics associated with hosting the web sites 620-650 as is generally known in the art.

As shown in FIG. 6, the SLAs for the web sites 620-650 include a plurality of minimum SLA requirements including a cpu usage requirement, a storage system usage requirement, a bandwidth usage requirement, and the like. In addition, one or more penalties are associated with the SLAs that identify the amount paid by the services provide in the event that the services provider does not meet the minimum requirements of the SLA.

Assume that the SLM system determines that an imminent breach of the SLA associated with web site A 620 is predicted. The present invention may identify the penalties associated with the other SLAs of web sites B-D 630-650 and identify a lowest penalty SLA to breach instead of breaching the SLA of web site A 620, assuming that there is a lower penalty associated with a SLA other than the one for web site A 620.

In the depicted example, the SLA for web site B 630 has the lowest penalty associated with it. Thus, in a simplified implementation of the present invention, web site B 630 will be chosen as the web site from which system resources will be reallocated for use by web site A 620. In such an embodiment, the orchestration system 550 of FIG. 5 may make use of a feedback loop with the SLM system 540 to determine if reallocation of resources from web site B 630 to web site A 620 provides sufficient resources to avoid the predicted breach of web site A's SLA. If not, additional resources may be reallocated or the reallocation may be modified until the breach of web site A's SLA is no longer predicted to be imminent.

In a more complex reallocation implementation of the present invention, both the penalties associated with the SLAs and the current resource allocation are taken into account when determining from which web site to reallocate system resources. In such an embodiment, while web site B 630 may have the lowest penalty associated with its SLA, the resource allocation to web site B 630 may be not be sufficient that reallocation of these system resources will avoid the breach of the SLA for web site A 620. Moreover, a combination of breaching the SLA for web site B 630 and web site C 640 results in too high a penalty being paid. As a result, web site D 650 may be selected as the web site D 650 from which a system resources are reallocated even though web site D 650 does not have the lowest SLA penalty associated with it.

In yet another embodiment, historical information for web site D 650 may indicate that its SLA has been breached 3 times within the last 20 days. As a result, it may not be desirable to reallocate system resources from web site D 650 and risk the services consumer pulling their business from the services provider. As a result, while web site D 650 may provide the minimum penalty with regard to an SLA breach, the originally predicted SLA breach may be permitted to occur in order to avoid the risk of loss of business from the services consumer associated with web site D 650.

It should be appreciated that, for the sake of simplicity, the above description of the preferred embodiments makes use of fixed penalty values associated with SLAs, however the present invention is not limited to such. Rather, the penalty may be dynamically determined based on a severity of the breach of the SLA, historical information regarding previous breaches of the SLA, current conditions, e.g., time of day, day of the week, holiday schedules, and the like. As a result, part of determining a minimum penalty cost SLA to breach would involve determining what the current or predicted value of the penalty cost for each SLA would be if breached based on the definition of the penalty provided in the machine readable SLA as well as data from other sources, such as historical information regarding past breaches of SLAs. In such an embodiment, the orchestration system 550, or alternatively the SLM system 540, would retrieve additional information necessary to determine the current or predicted value of the penalty for SLAs from other computerized sources.

Figure 7:
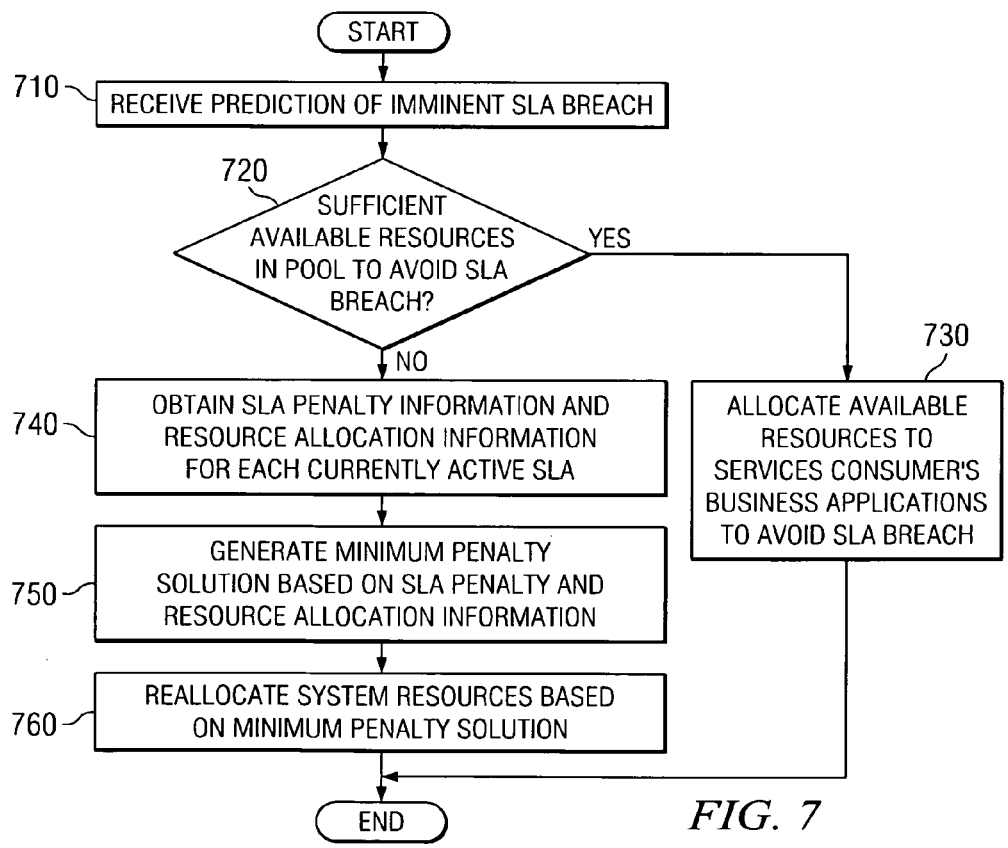
FIG. 7 is a flowchart outlining an exemplary operation of one embodiment of the present invention.

FIG. 7 is a flowchart outlining an exemplary operation of one embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 7, the operation starts with receipt of a prediction that an SLA breach is imminent (step 710). A determination is then made as to whether there are sufficient available resources in a system resource pool to avoid the SLA breach (step 720). If so, the system resources are allocated to the services consumer's business applications associated with the SLA in order to avoid the predicted SLA breach (step 730). If not, SLA penalty information and resource allocation information is obtained for each of the currently active SLAs of the services provider (step 740).

A minimum penalty solution is then generated based on the SLA penalty information and resource allocation information (step 750). As stated above, in a more complex embodiment of the present invention, this minimum penalty solution may further include taking into account historical information about SLA breaches in order to avoid risk of a services consumer pulling business from the services provider.

The system resources are then reallocated from services consumers' business applications in accordance with the minimum penalty solution (step 760) and the operation then terminates. It should be appreciated that this process may be repeated in a feedback loop manner in order to continuously make sure that penalties paid by the services provider are kept to a minimum even in the event of SLA breaches.

Thus, the present invention provides a mechanism for minimizing the costs to service providers due to breaches of service level agreements. With the present invention, service level agreements are provided in a machine readable format such that penalty information may be extracted from them, as well as other SLA requirements. These penalties, along with other information, may then be used to determine an optimum SLA to breach in order to minimize penalties when faced with an imminent SLA breach.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for allocating service provider system resources to hosted applications, comprising:
   determining whether a breach of a first SLA, in a plurality of service level agreements (SLAs) currently being serviced by service provider system resources, is imminent;
   retrieving SLA information for the plurality of SLAs;
   determining a minimum penalty SLA from the plurality of SLAs based on the retrieved SLA information; and
   reallocating service provider system resources from applications associated with the minimum penalty SLA to applications associated with the first SLA.

2. The method of claim 1, wherein retrieving SLA information for the plurality of SLAs includes extracting the SLA information from one or more Extensible Markup Language (XML) documents in an SLA storage system.

3. The method of claim 1, wherein the SLA information includes one or more penalties associated with each of the SLAs in the plurality of SLAs, and wherein determining a minimum penalty SLA based on the retrieved SLA information includes:
   identifying a lowest cost penalty from the one or more penalties associated with each SLA of the plurality of SLAs;
   comparing the lowest cost penalty from the one or more penalties associated with each SLA of the plurality of SLAs to a penalty associated with the first SLA; and
   selecting an SLA associated with either the lowest cost penalty from the one or more penalties associated with each SLA of the plurality of SLAs or the first SLA as a minimum penalty SLA based on the comparison.

4. The method of claim 1, further comprising:
   retrieving current service provider system resource allocation information for applications associated with each SLA of the plurality SLAs, wherein the SLA information includes one or more penalties associated with each SLA of the plurality of SLAs, and wherein determining a minimum penalty SLA based on the retrieved SLA information includes:

identifying a subset of SLAs from the plurality of SLAs that have a sufficient current allocation of service provider system resources to be reallocated to applications associated with the first SLA in order to avoid breaching the first SLA;

identifying a lowest penalty associated with SLAs in the subset of SLAs, to thereby identify a lowest penalty SLA candidate; and selecting the lowest penalty SLA candidate as the minimum penalty SLA.

5. The method of claim 4, further comprising:

retrieving historical information for the lowest penalty SLA candidate;

determining if the lowest penalty SLA candidate has been breached more than a threshold number of times within a predetermined time period based on the historical information; and selecting a next lowest penalty SLA from the subset of SLAs as the lowest penalty SLA candidate if the lowest penalty SLA candidate has been breached more than a threshold number of times within the predetermined time period.

6. The method of claim 1, wherein determining whether a breach of a first SLA is imminent includes using a prediction engine to generate a prediction of whether the first SLA will be breached based on monitored metrics of a service provider system.

7. The method of claim 6, wherein the prediction engine is a trend analysis algorithm associated with a service level management system.

8. The method of claim 1, wherein, if it is determined that a breach of a first SLA is not imminent, allocation of service provider system resources is performed in a default manner.

9. A non-transitory computer readable medium encoded with a computer program product that is operable with a data processing system for allocating service provider system resources to hosted applications, comprising:

first instructions for determining whether a breach of a first SLA, in a plurality of service level agreements (SLAs) currently being serviced by service provider system resources, is imminent;

second instructions for retrieving SLA information for the plurality of SLAs;

third instructions for determining a minimum penalty SLA from the plurality of SLAs based on the retrieved SLA information; and fourth instructions for reallocating service provider system resources from applications associated with the minimum penalty SLA to applications associated with the first SLA.

10. The non-transitory computer readable medium of claim 9, wherein the second instructions for retrieving SLA information for the plurality of SLAs include instructions for extracting the SLA information from one or more Extensible Markup Language (XML) documents in an SLA storage system.

11. The non-transitory computer readable medium of claim 9, wherein the SLA information includes one or more penalties associated with each SLA of the plurality of SLAs, and wherein the third instructions for determining a minimum penalty SLA based on the retrieved SLA information include:

instructions for identifying a lowest cost penalty from the one or more penalties associated with each SLA of the plurality of SLAs;

instructions for comparing the lowest cost penalty from the one or more penalties associated with each SLA of the plurality of SLAs to a penalty associated with the first SLA; and instructions for selecting an SLA associated with either the lowest cost penalty from the one or more penalties associated with each SLA of the plurality of SLAs or the first SLA as a minimum penalty SLA based on the comparison.

12. The non-transitory computer readable medium of claim 9, further comprising:

fifth instructions for retrieving current service provider system resource allocation information for applications associated with each SLA of the plurality of SLAs, wherein the SLA information includes one or more penalties associated with each SLA of the plurality of SLAs, and wherein the third instructions for determining a minimum penalty SLA based on the retrieved SLA information include:

instructions for identifying a subset of SLAs from the plurality of SLAs that have a sufficient current allocation of service provider system resources to be reallocated to applications associated with the first SLA in order to avoid breaching the first SLA;

instructions for identifying a lowest penalty associated with SLAs in the subset of SLAs, to thereby identify a lowest penalty SLA candidate; and instructions for selecting the lowest penalty SLA candidate as the minimum penalty SLA.

13. The non-transitory computer readable medium of claim 12, further comprising:

instructions for retrieving historical information for the lowest penalty SLA candidate;

instructions for determining if the lowest penalty SLA candidate has been breached more than a threshold number of times within a predetermined time period based on the historical information; and instructions for selecting a next lowest penalty SLA from the subset of SLAs as the lowest penalty SLA candidate if the lowest penalty SLA candidate has been breached more than a threshold number of times within the predetermined time period.

14. The non-transitory computer readable medium of claim 9, wherein the first instructions for determining whether a breach of a first SLA is imminent include instructions for using a prediction engine to generate a prediction of whether the first SLA will be breached based on monitored metrics of a service provider system.

15. The non-transitory computer readable medium of claim 14, wherein the prediction engine is a trend analysis algorithm associated with a service level management system.

16. The non-transitory computer readable medium of claim 9, wherein, if it is determined that a breach of a first SLA is not imminent, allocation of service provider system resources is performed in a default manner.

17. An apparatus for allocating service provider system resources to hosted applications, the apparatus comprising a data processor coupled to a memory that includes instructions that are operable by the data processor for performing steps of:

determining whether a breach of a first SLA, in a plurality of service level agreements (SLAs) currently being serviced by service provider system resources, is imminent;

retrieving SLA information for the plurality of SLAs;

determining a minimum penalty SLA from the plurality of SLAs based on the retrieved SLA information; and reallocating service provider system resources from applications associated with the minimum penalty SLA to applications associated with the first SLA.

18. The apparatus of claim 17, wherein the SLA information includes one or more penalties associated with each SLA of the plurality of SLAs, and wherein the instructions for determining a minimum penalty SLA based on the retrieved SLA information include instructions for:
identifying a lowest cost penalty from the one or more penalties associated with each SLA of the plurality of SLAs;
comparing the lowest cost penalty from the one or more penalties associated with each SLA of the plurality of SLAs to a penalty associated with the first SLA; and
selecting an SLA associated with either the lowest cost penalty from the one or more penalties associated with each SLA of the plurality of SLAs or the first SLA as a minimum penalty SLA based on the comparison.

19. The apparatus of claim 17, wherein the instructions are further operable for performing steps of:
retrieving current service provider system resource allocation information for applications associated with each SLA of the plurality of SLAs, wherein the SLA information includes one or more penalties associated with each SLA of the plurality of SLAs, and wherein the instructions for determining a minimum penalty SLA based on the retrieved SLA information include instructions for:
identifying a subset of SLAs from the plurality of SLAs that have a sufficient current allocation of service provider system resources to be reallocated to applications associated with the first SLA in order to avoid breaching the first SLA;
identifying a lowest penalty associated with SLAs in the subset of SLAs, to thereby identify a lowest penalty SLA candidate; and
selecting the lowest penalty SLA candidate as the minimum penalty SLA.

20. The apparatus of claim 19, wherein the instructions are further operable for performing steps of:
retrieving historical information for the lowest penalty SLA candidate;
determining if the lowest penalty SLA candidate has been breached more than a threshold number of times within a predetermined time period based on the historical information; and
selecting a next lowest penalty SLA from the subset of SLAs as the lowest penalty SLA candidate if the lowest penalty SLA candidate has been breached more than a threshold number of times within the predetermined time period.

* * * * *